United States Patent [19]

Malek et al.

[11] Patent Number: 5,666,366
[45] Date of Patent: Sep. 9, 1997

[54] INTER-BASE SYNCHRONIZATION TECHNIQUE FOR A TDMA COMMUNICATION SYSTEM

[75] Inventors: Charles J. Malek, Crystal Lake, Ill.; David L. Weigand; Dennis M. Rose, both of Sunnyvale, Calif.; Gerard G. Socci, Palo Alto, Calif.

[73] Assignee: National Semiconductor Corporation, Santa Clara, Calif.

[21] Appl. No.: 655,576

[22] Filed: May 24, 1996

[51] Int. Cl.$^6$ .................................................. H04J 3/07
[52] U.S. Cl. ........................... 370/505; 370/506; 370/503; 375/354
[58] Field of Search .......................... 370/95.3, 100.1, 370/102, 103, 105.1, 105.2, 105.3, 108, 104.1; 375/354, 356, 371

[56] References Cited

U.S. PATENT DOCUMENTS

| | | | |
|---|---|---|---|
| 3,562,432 | 2/1971 | Gabbard | 179/15 |
| 3,646,444 | 2/1972 | Bitzer | 325/58 |
| 3,654,395 | 4/1972 | Schmidt | 179/15 BS |
| 4,811,340 | 3/1989 | McEachern et al. | 370/102 |
| 5,184,350 | 2/1993 | Dara | 370/105.3 |
| 5,541,929 | 7/1996 | Jokura | 370/95.3 |

Primary Examiner—Douglas W. Olms
Assistant Examiner—A. Bnimoussa
Attorney, Agent, or Firm—Skjerven, Morrill, MacPherson, Franklin, & Friel; Brian D. Ogonowsky

[57] ABSTRACT

A synchronization method for synchronizing a plurality of base stations in a TDMA communication system is disclosed. The synchronization topology may be via dedicated hardwire, via any DSL from the PSTN, or via an ad-hoc RF synchronization technique. Slots containing data are arranged in frames and these frames are transmitted to the base stations, and received from the base stations, by wireless telephone handsets. Each of the slots in a frame have a guard field comprising a plurality of guard bits. The base stations derive frame sync pulses via the received Unique Word correlation detect. These derived frame sync pulses are ultimately synchronized with frame sync signals received from the master base station. The slave base stations are maintained in synchronization with the master base station by using a phase locked loop (DPLL) which adds or deletes a final bit in the guard field of a frame to either advance or delay the frame sync pulse generated within the slave base station as necessary to maintain synchronization between the frame sync pulses generated by the slave base station and the frame sync pulses generated by the master base station.

17 Claims, 6 Drawing Sheets

INTER-BASE SYNCHRONIZATION TECHNIQUE FOR A TDMA COMMUNICATION SYSTEM

CROSS-REFERENCE TO RELATED APPLICATIONS

This application is related to U.S. application Ser. No. 08/621,266, filed on Mar. 21, 1996, entitled "Multi-Tasking Sequencer For a TDMA Burst Mode Controller." This application is also related to U.S. application Ser. No. 08/655,355, filed herewith, entitled "Seamless Handover in a Cordless TDMA System," and to U.S. application Ser. No. 08/653,531, filed herewith, entitled "Audio Error Mitigation for a TDMA System." The above applications are assigned to the present assignee and incorporated herein by reference.

FIELD OF THE INVENTION

This invention relates to time division multiple access (TDMA) communication systems and, in particular, to a synchronization technique for dynamically synchronizing base stations in a TDMA system.

BACKGROUND

In a TDMA communication system, a number of transmitters can transmit on the same frequency channel, but at different times. A remote receiver for receiving a particular transmitted signal knows beforehand at what time the transmitted signal will occur and receives only during that time. The use of TDMA makes very efficient use of the frequency spectrum since multiple users may use the same frequency channel at the same time without interfering with one another.

Figure 1:
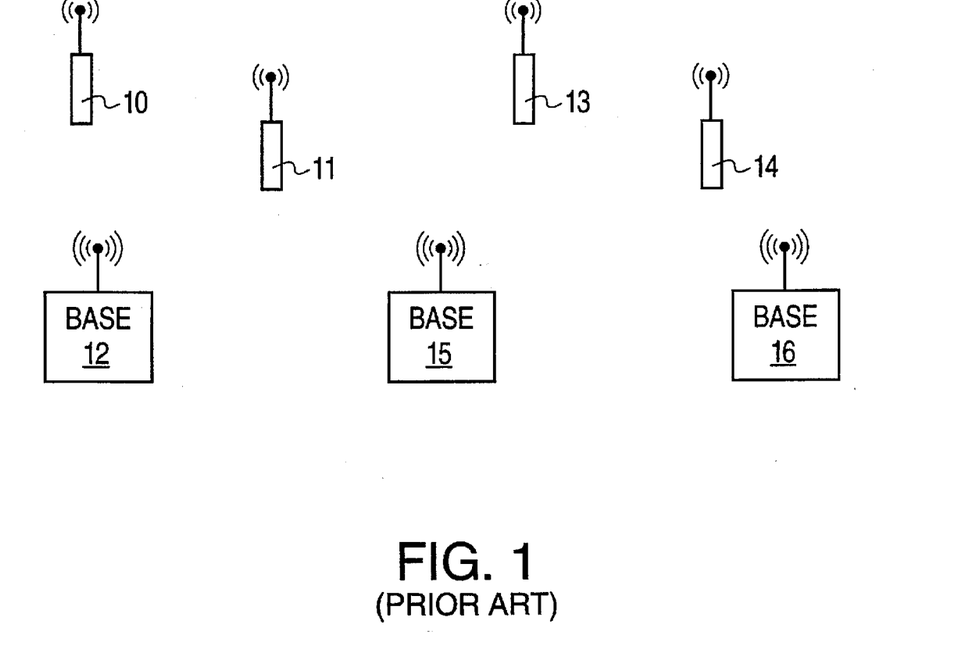
FIG. 1 illustrates a prior art TDMA system consisting of stationary base stations and portable telephone transceivers.

FIG. 1 illustrates one type of TDMA system where handheld wireless telephones 10 and 11 share a same frequency channel while transmitting to and receiving from a nearby higher power base station 12. All communications made by telephones 10 and 11 are routed through base station 12 as long as telephones 10 and 11 are in the vicinity of base station 12. The various base stations in the TDMA system are connected to the public telephone lines (not shown).

Additional wireless telephones 13 and 14 are also shown in FIG. 1. Telephone 13 routes its communications through its closest base station 15, and telephone 14 routes its communications through its closest base station 16. The various base stations 12, 15, and 16 convert the received TDMA signals from the handheld telephones 10, 11, 13 and 14 to conventional analog POTS, BRI, or PRI signals for transmission over the telephone lines. Similarly, the base stations 12, 15, and 16 convert the received information on the telephone lines to TDMA signals for transmission to the handheld telephones 10, 11, 13, and 14. Thus, all of the handheld telephones 10, 11, 13 and 14 can communicate with another telephone inside or outside of the TDMA system.

The base stations 12, 15, and 16 receive or transmit time-division multiplexed signals simultaneously. To avoid co-channel interference between telephones using neighboring base stations, neighboring base stations generally operate on different frequency channels, where the frequency channel is automatically selected to minimize co-channel interference. Such a TDMA system may be the Personal Handy Phone System, common in Japan, whose requirements are described in the RCR Standard-28, incorporated herein by reference. As an alternate embodiment, such a TDMA system may be the European ETSI DECT standard, also incorporated herein by reference. Another such alternate embodiment may be the North American PACS standard. Further, slow frequency hopping systems, compliant with CFR Title 47, part 15, and intended for the U.S. ISM-bands, may be derived from the aforementioned formal standards. The operation of such TDMA systems are well known.

Figure 2:
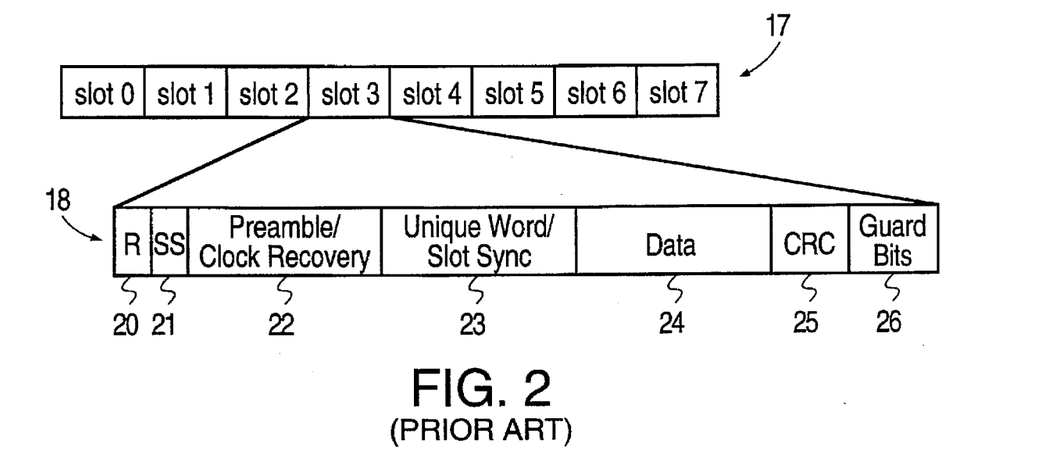
FIG. 2 illustrates a single frame containing slots which are transmitted/received on a single frequency channel in a conventional TDMA system.

In a TDMA system, each wireless telephone 10, 11, 13, and 14, when active, is allocated certain time slots within which it may transmit a bursted signal or receive a bursted signal. FIG. 2 illustrates a frame 17 containing slots 0 through 7, where frame 17 is repeated on a single frequency channel. Other TDMA systems may use 24, 32, or other number of slots in a frame. The period of frame 17 may be, for example, 5 milliseconds. Assuming wireless telephones 10 and 11 in FIG. 1 are being actively used at the same time, telephones 10 and 11 may be allocated slots 0 and 1, respectively, for transmitting bursted signals to base station 12, while allocated slots 4 and 5, respectively, for receiving bursted signals from base station 12. Two additional telephones (e.g., 13 and 14) entering the vicinity of base station 12 may use the available slots 2, 3, 6, and 7 in a similar manner. The amount of information stored in each telephone 10, 11, 13, and 14 during a frame period is transmitted in a burst within a single slot.

A sample protocol 18 for a slot is also shown in FIG. 2, where protocol 18 dictates the information required to be transmitted during a single slot. Protocol 18 may consist of a ramp-up field 20, a start symbol field 21, a clock recovery field 22, a slot sync (or Unique Word) field 23, a data field 24, a CRC field 25 (for error correction and verification), and a guard band field 26. The lengths and types of fields in a protocol vary depending on the mode of the transceiver (e.g., registration mode, paging mode, call set up mode, transmit/receive mode, etc.). While in the traffic mode, where voice is to be transmitted, data field 24 contains audio data. Data field 24 is referred to as the traffic channel or TCH.

In one embodiment, the bit rate of the transmitted bits in a frame 17 is approximately 384K bits per second, and the modulation technique is π/4DQPSK. Therefore, the corresponding symbol rate is 192K symbols per second.

As the wireless telephones are transported in their communication mode to different areas handled by different base stations, there must be a non-detectable handover to another base station. Such a handover may require the telephone to transmit/receive in a different slot pair within a frame whether on the same frequency channel or a different frequency channel. To achieve such a handover and to maximize the use of the channel, each base station and wireless telephone transmits/receives slots and frames in synchronization so as to align the various slot times within a frame throughout the TDMA system.

Typically, with a hard-wired star or an ad-hoc RF base station synchronization topology, the various base stations remain in-sync by detecting an edge of another base station's signal and adjusting its local bit/slot pointer. Such a clock de-skewing technique has been known to suffer from coupling-induced EMI and other drawbacks. What is needed is a more robust synchronization technique for a TDMA communication system.

SUMMARY

A synchronization method for synchronizing a plurality of base stations in a TDMA communication system is disclosed.

Slots containing data are arranged in frames and these frames are transmitted to the base stations, and received from the base stations, by wireless telephone handsets. Each of the slots in a frame have a guard field comprising a plurality of guard bits. All base stations must receive and transmit frames in sync to maximize the use of the frequency spectrum. The base stations derive frame sync pulses using a Unique Word correlation. These derived frame sync pulses are synchronized with frame sync pulses from a master base station.

The slave base stations are maintained in synchronization with the master base station by using a digital phase locked loop (DPLL) which adds or deletes a final bit in the guard field of a frame to either advance or delay the frame sync pulse generated within the slave base station as necessary to maintain synchronization between the frame sync pulses generated by the slave base station and the frame sync pulses generated by the master base station. The addition or deletion of a pulse during the guard time of a single slot within a frame is in response to a phase compare operation between the remote master sync-in and the locally generated sync signals.

DETAILED DESCRIPTION OF THE PREFERRED EMBODIMENTS

Overview of TDMA Controller

Figure 3:
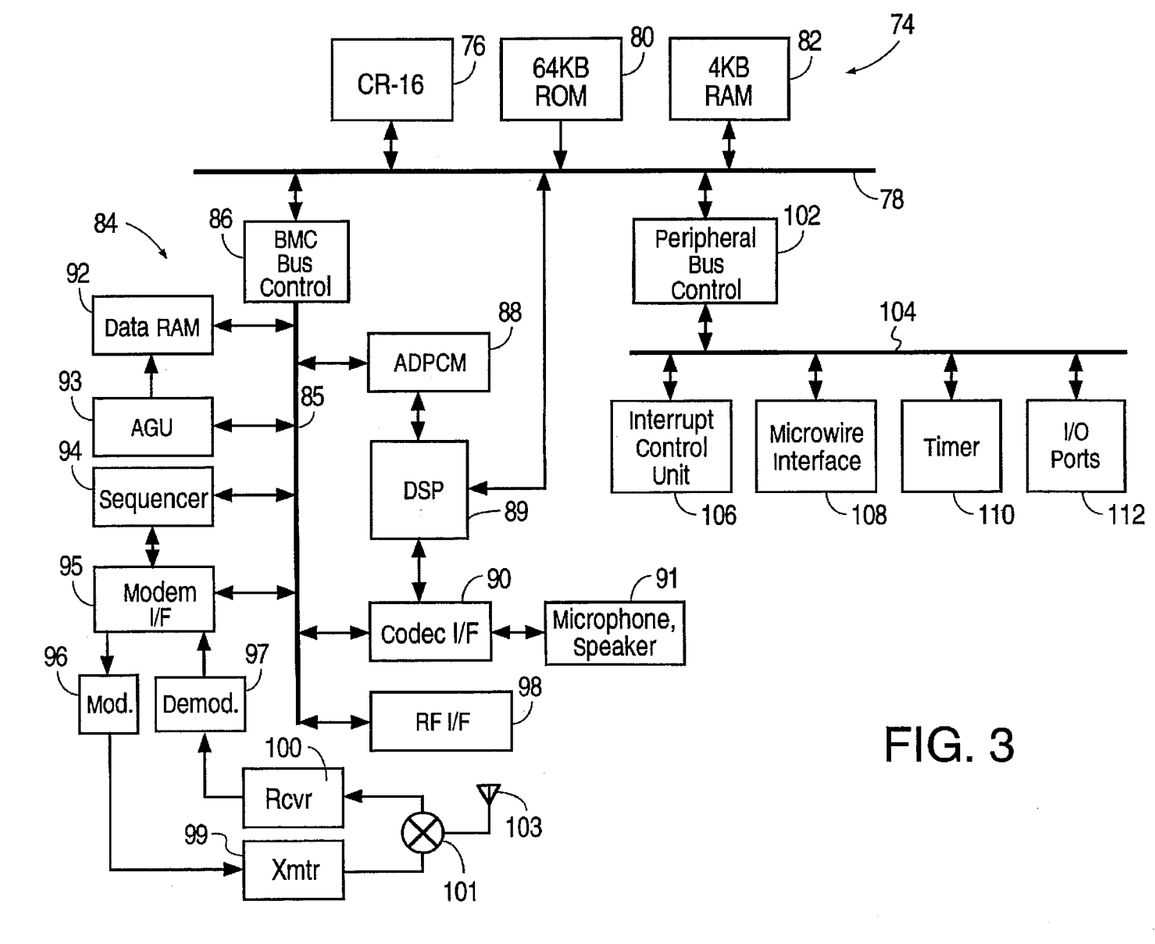
FIG. 3 illustrates the basic architecture of the preferred embodiment TDMA system transceiver.

FIG. 3 illustrates the preferred embodiment TDMA controller architecture incorporating certain novel features. This architecture may be used in a TDMA system such as shown in FIG. 1. The controller of FIG. 3 is the same for the base stations and the handheld wireless telephones in the TDMA system. The TDMA controller 74 includes a microprocessor 76, such as a model CR-16 from National Semiconductor Corporation, for high level control over the TDMA controller functions. The Microprocessor 76 is connected to a system bus 78 along with a program ROM 80 and static RAM 82. RAM 82 is used for storing information for various purposes, such as storing program variables, mailbox information, and stack parameters.

A burst mode controller (BMC) 84 for creating the slots for transmission at precise times is also connected to system bus 78 and consists of a number of components. A BMC bus 85 is connected to system bus 78 via a BMC bus controller 86, whose general function would be understood by those skilled in the art.

An adaptive differential pulse code modulation (ADPCM) voice coder 88 provides encoding and decoding of audio information. A digital signal processor 89 interacts with voice coder 88 and an interface unit 90 to generate the audio information bits to be transmitted.

A microphone and speaker 91 in the telephone handset are connected to interface unit 90. In the base station, interface unit 90 is connected to the land-line network connection.

A slot opcode data RAM 92 contains certain protocol bits, address bits, and data bits which will be called upon during operation of the TDMA controller to build a slot for transmission or to store a received slot. An address generation unit (AGU) 93 addresses the information in RAM 92 under the control of a sequencer 94. Sequencer 94, which will be described in greater detail later, is the device that controls assembling the slots for transmission, and disassembling the slots after reception, at synchronized times by outputting control flow sequences to the modem interface unit 95.

Modem interface unit 95 receives control signals from sequencer 94 and, in response, retrieves the bits from various sources, such as data RAM 92, for building the serial bit stream in a slot. Modem interface unit 95 also distributes the bits in a received slot to the appropriate destinations for further processing by the microprocessor and the ADPCM engine.

The serial bit stream for transmission by transmitter 99 is sent to a modulator 96, while a demodulator 97 sends a received bit stream from receiver 100 to modem interface unit 95 for processing. The demodulator 97 also contains modules for performing clock and slot synchronizing (using the Unique Word field 23 and the Preamble in FIG. 2), whereby matching synchronization/clock codes cause demodulator 97 to issue synchronization signals to sequencer 94. Encryption/decryption circuitry may be connected to the modulator 96 and demodulator 97.

An RF interface 98 circuit is also included. The RF interface 98 circuit is typically comprised of an additional microwire interface intended to load a PLL synthesizer(s) in the RF deck and also provides control signals to the RF deck, such as various transmit/receive, power down, antenna steering, or Received Signal Strength Indicator (RSSI) capture signals.

A transmit/receive switch 101 and antenna 103 are also shown.

The peripheral devices and their controllers are also connected to system bus 78. Such devices, include, for example, a peripheral bus control 102 for coordinating access between the system bus 78 and the peripheral bus 104, an interrupt control unit 106, a microwire interface 108 for interfacing with, for example, a digital answering machine, a timer 110, and the various input/output ports 112 which are connected to, among other things, a transmitter and receiver portion of the transceiver.

Since this disclosure primarily deals with the operation and construction of certain novel circuits and architecture within the TDMA system, the remaining hardware may be conventional or slightly modified in view of the novel circuits and architectures.

Description of Sequencer 94

Figure 4:
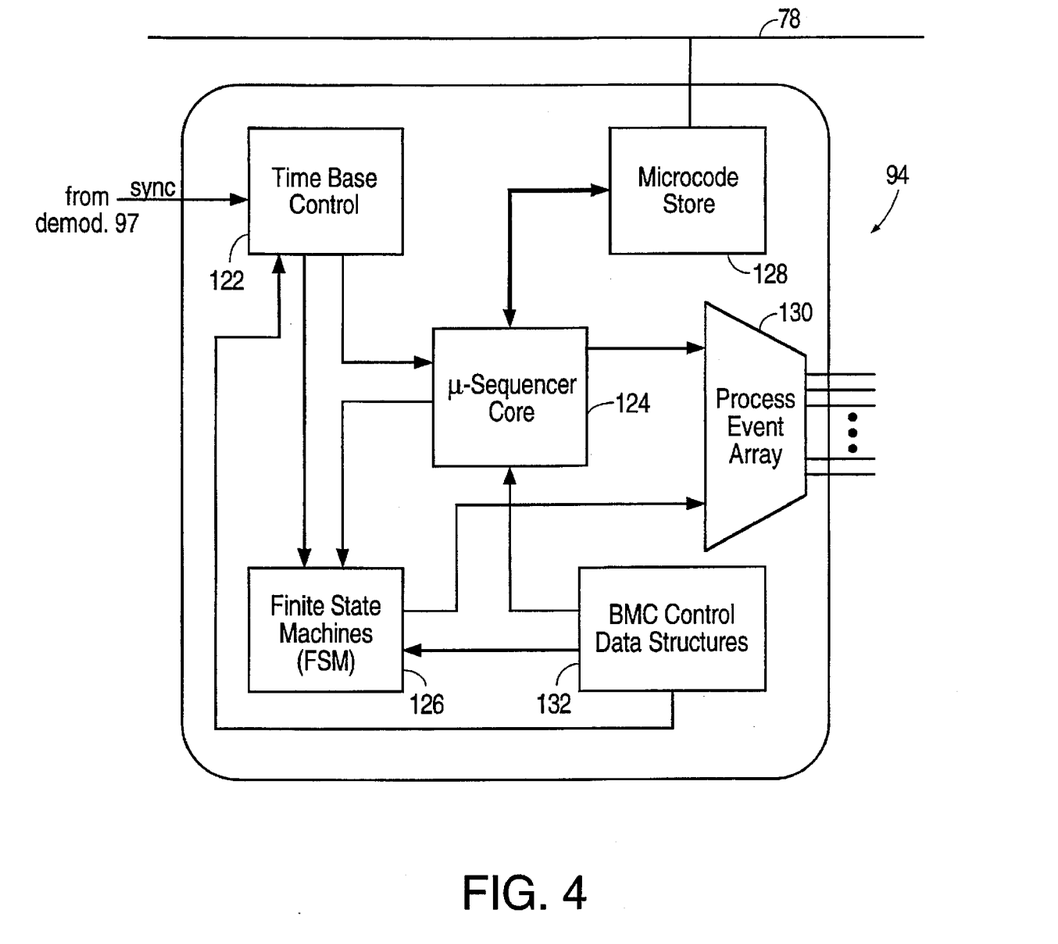
FIG. 4 illustrates additional detail of the preferred sequencer used in the TDMA transceiver.

As previously mentioned, the operation of sequencer 94 in the TDMA controller is to issue precisely bit-timed multiple control flow signals to the modem interface unit 95 in order to assemble or disassemble the slots within a frame and ensure the bits within the slots are synchronized with the base station transceiver. FIG. 4 illustrates the pertinent portions of sequencer 94. Additional detail of sequence 94 is found in U.S. application Ser. No. 08/621,266, filed Mar. 21, 1996, entitled "Multi-Tasking Sequencer For a TDMA Burst Mode Controller," by David Weigand and Charles Malek.

Sequencer 94 includes a core 124 which contains conditional logic circuits and an address generation unit (AGU) for selecting a next address in the microcode store 128. The AGU can cause the microcode sequence to jump to an appropriate subroutine, such as a set-up, paging, RSSI, transmit, or receive subroutine.

A time base control 122 which is generated from the recovered receive clock in a handset outputs frame, slot, and bit pointer signals synchronized with the bit rate of the base station (e.g., base station 12 in FIG. 1). Synchronization of a slot within the handset with the allocated slot time may be performed by correlating the Unique Word field in a slot with the expected Unique Word (FIG. 2) transmitted by the base station.

If the controller is located in a base station, time base control 122 outputs frame, slot, and bit pointer signals which are synchronized with a master base station. Any base station can be a master or a slave base station. The RF transmission of each base station contains a Unique Word in each slot in the frame. Upon receiving the transmission and correlating the Unique Word field against the expected Unique Word, a frame sync pulse is derived.

One base station is designated a master base station, and the other base stations, acting as slave base stations, synchronize to the master base station by synchronizing their frame pointers to the master frame pointer. Depending on the arrangement of base stations, synchronization can be performed in a ladder fashion where synchronization is performed by slave base stations receiving sync signals from other slave base stations, or performed in a star fashion where all the slave base stations receive the sync signal directly from the master base station. Additional detail of the time base control 122 regarding such synchronization will be discussed with respect to FIGS. 5–9.

The time base control 122 provides the timing signals to the sequencer core 124 and to the finite state machines (FSMs) 126.

The microcode store 128, which may be ROM or RAM based, contains a series of commands for the sequencer core 124, which in turn provides enabling commands to the FSMs 126. Microcode store 128 is connected to microprocessor 76 in FIG. 3 via bus 78. The microcode instructions need not specify each step for creating a slot protocol, such as protocols 140 and 142 in FIG. 5, since the FSMs 126 now perform the function of building the protocols. For example, when a voice transmit sequence is to begin, the microcode store 128 provides an initiate voice transmit command to the micro-sequencer core 124 which then enables the proper FSM 126 to build a slot for the transmit function. In a preferred embodiment, microcode store 128 also contains certain command flow sequences which are sometimes output from the sequencer 94 along with a FSM command flow sequence.

Figure 5:
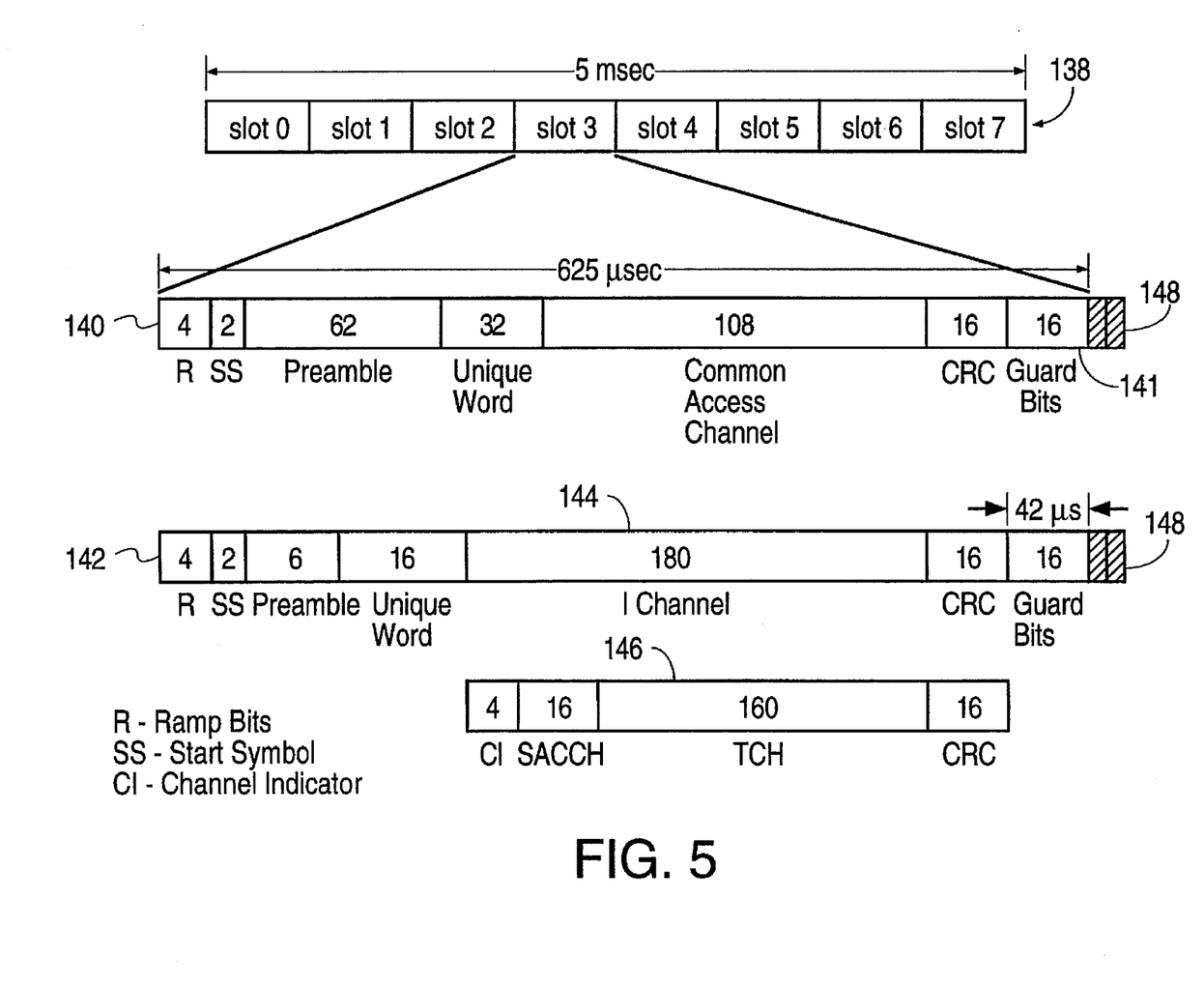
FIG. 5 depicts protocols for a particular TDMA system which are built by the sequencer and whose lengths are adjusted using the present invention to achieve synchronization within the TDMA network system.

Each of the FSMs 126 is a hardware state machine which provides a sequence of control codes synchronized with the bit rate clock provided by the time base control 122. The FSM 126 control codes are then applied to the inputs of the process event array 130, which acts as a combiner and re-times the sequencer's 94 output. The control codes output by sequencer 94 on bus 85 and to modem interface unit 95 (FIG. 3) essentially enable and disable various devices and operations in the proper sequence and at the proper times to build a slot in the appropriate protocol as shown in FIG. 5. For example, the fixed codes in the Ramp, Start Symbol, Preamble, and Unique Word fields may be inserted into a slot at the proper times by enabling fixed parallel-to-serial storage devices containing those fixed codes. These storage devices may be located in modem interface 95 in FIG. 3.

Audio data for the voice field may be inserted into a slot by first converting the analog audio signals into the ADPCM format and storing the ADPCM data into the appropriate transmit slot location in the Data RAM 92 using an ADPCM channel pointer. The ADPCM data is then addressed at the appropriate time by a slot pointer and transferred to parallel-to-serial circuitry in modem interface unit 95. Cyclic Redundancy Check (CRC) data may be inserted by instructing a CRC unit in modem interface unit 95 to generate the CRC data. Similarly, audio data from a received slot is stored in the appropriate receive slot location in the Data RAM 92 using the slot pointer. This received data is later addressed by the ADPCM pointer for decoding and further processing.

The BMC control and data structure block 132 in FIG. 4 contains opcode registers for each of slots 0–7 and contains any other data which may be used by FSMs 126 and sequencer core 124, such as the lengths of the various fields in the protocols. The various patent applications incorporated herein by reference provide addition detail of the opcodes.

Description of PHS Protocol

FIG. 5 illustrates the protocol used for a Personal Handy Phone System (PHS) in accordance with RCR STD-28, in which the present invention may be utilized. The present invention, however, may be used in any TDMA system although the PHS protocol will be used as an example. The PHS frame 138 is 5 msec and continually repeats while the system is on. Frame 138 is for a single frequency channel. Other frequency channels would include identical frames. Each slot 0–7 represents a burst of information being transmitted from a wireless telephone or by the base station. Each slot has an allocation of approximately 625 microseconds. As described with respect to FIGS. 1 and 2, a first telephone using the frequency band may transmit on slot 0 of each frame 138 and receive on slot 4 of each frame 138. A second telephone using the system may transmit on slot 1 of each frame 138 and receive on slot 5 of each frame 138. Similar allocations of slots 2, 3, 6, and 7 apply to third and fourth telephones also actively interfacing with a base station.

While the portable telephone is in a control mode such as in a standby mode or initiating access to the TDMA system, the protocol of a slot resembles that of protocol 140. In protocol 140, the R field is for ramping up the transmitter to the required power level and thus provides a delay. The Start Symbol (SS) field includes the bits 01. The Preamble field consists of a repeated code 0011 for clock recovery. The Unique Word is a fixed pattern which is used by the telephone handset to correlate against a received pattern and obtain synchronization of a slot to be received. The next field in protocol 140 is a Common Access Channel for a control channel or is an I-field channel for a communications channel, which includes various fields in accordance with the RCR STD-28 and provides status and other information in order to set up a telephone call. Guard bits in a guard bits field 141 are provided to ensure that bits from consecutive slots do not overlap. In the example of FIG. 5, there are 16 guard bits at the end of a slot; however, in other embodiments, the guard bits can occur at the beginning of a slot and can be greater or less than 16.

Once a synchronized channel is established for a telephone communication, the protocol now changes to the communication protocol 142, which includes similar synchronization fields, but with different bit lengths as shown in FIG. 5. Protocol 142 includes either an information channel field 144 for non-voice communication or a voice traffic channel (TCH) 146. Protocol 142, when used on a communications channel, also includes a Channel Indicator (CI) field and a Slow Associated Control Channel (SACCH) field. Further details would be understood by those skilled in the art.

Description of Synchronization Technique

As previously mentioned, each of the base stations, such as base stations 12, 15, and 16 in FIG. 1, must be in synchronization with each other so as to start and end a frame at the same time. The preferred embodiment TDMA system contains a synchronization circuit in the time base control 122 (FIG. 4) of the sequencer 94 which detects whether a slave base station is either early or late with respect to the frame-sync of the master base station and, in response to such detection, either adds a bit or deletes a bit from the guard bits field 141 (FIG. 5) at the end of a frame.

The addition or deletion of a bit from the guard bits field 141 of slot 7 is illustrated by the shaded portion 148 representing a ±1 bit variance in the guard bits field 141. Thus, in the example of FIG. 5, the guard bits field 141 can be 15, 16, or 17 bits depending on the requirements for frame synchronization. The guard bits field 141 in the other slots are not adjusted in the preferred embodiment.

Figure 6:
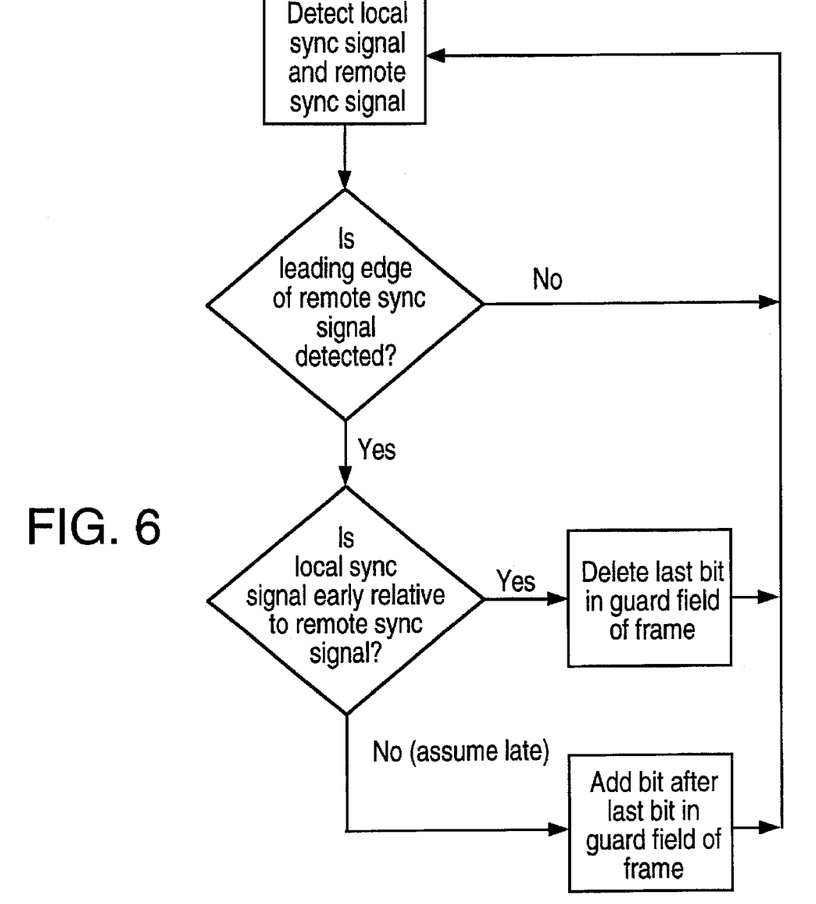
FIG. 6 shows the various steps performed in the preferred synchronization technique.

The novel frame synchronization technique between the base stations is described with respect to FIGS. 6–9. FIG. 6 is a flowchart illustrating the basic steps in the synchronization method, while the digital phase locked loop (DPLL) circuits of FIGS. 7–9 may be used to carry out the method.

In a first step, the slave-base station to be synchronized to the master base station receives, via an RF transmission, a frame sync pulse from the master base station corresponding to the beginning of a frame period. This received frame-sync signal is referred to as the remote sync signal in FIGS. 6–9. Such a signal is received by the demodulator 97 in FIG. 3. A locally generated frame-sync signal, derived from the received Unique Word, is generated internal to the time base control 122. The local sync signal and remote sync signal are applied to a phase comparator 150 in FIG. 7 which determines the offset between the remote sync signal and the local sync signal.

Figure 7:
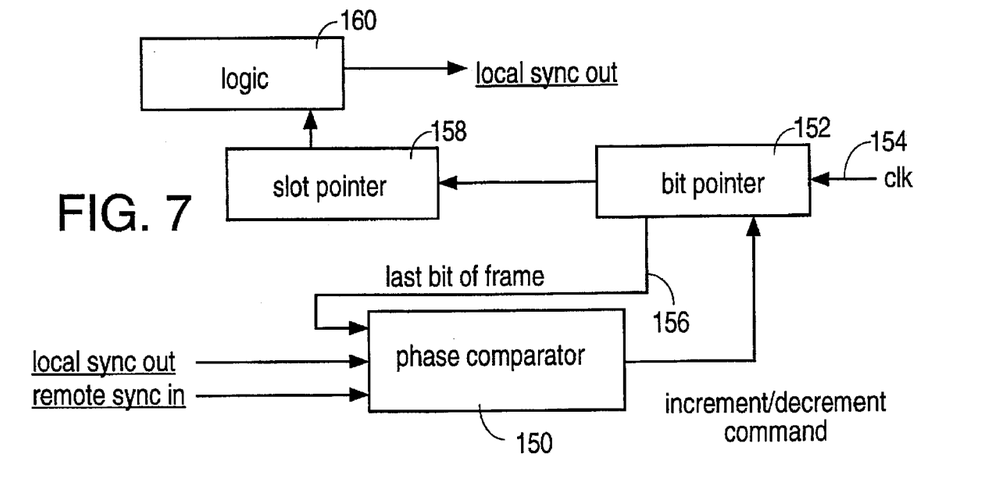
FIG. 7 illustrates one circuit for performing the synchronization technique of FIG. 6.

A bit pointer 152, being incremented by a local clock, counts the bits in the frame. In the particular format shown in FIG. 5 for the Personal Handy Phone System, there are 240 bits/slot and 8 slots/frame. After each 240 count in bit pointer 152, representing a slot period, slot pointer 158 is incremented. At the end of 8 slots, slot pointer 158 issues a signal to logic circuit 160 indicating the start of a new frame. In DECT, when bit pointer 152 counts up to 1920, corresponding to the last bit of the frame, a trigger signal is applied to the phase comparator 150 on line 156. For PHS, this is 8×240 bits.

If the phase comparator 150 detected that the previous local sync signal lagged the remote sync signal by more than 50% of a bit period, then bit pointer 152 is incremented by one count to delete a bit in the guard bits field 141. This advanced count in the bit pointer 152 will then prematurely indicate to the slot pointer 158 (now on slot 7) that the first slot of a new frame is to begin. Logic circuit 160 then issues a local sync out signal which signals the start of a new frame period. This local sync out signal is applied to the phase comparator 150 as shown in FIG. 7.

Conversely, if phase comparator 150 detected that the previous local sync signal led the remote sync signal by greater than 50% of a bit period, then on the last bit of a frame, phase comparator 150 signals to bit pointer 152 to decrement its count by one bit so as to add a bit to guard bits field 141 and essentially delay the start of a next frame by one bit period.

If phase comparator 150 detects that the local sync signal is within 50% of a bit period of the remote sync signal, then no adjustment is needed.

In other types of TDMA systems, the guard bits field may occur at the beginning of a slot. Accordingly, this technique of adding or deleting a bit from the guard bits field may occur anywhere within the frame while still achieving the goals of this invention. Applicants have found that adding or deleting more than one bit from the guard field bits is dependent upon the maximum time base disparity that needs to be accounted for, as well as the width of the correlation window opening to be used for the Unique Word field.

Figure 8:
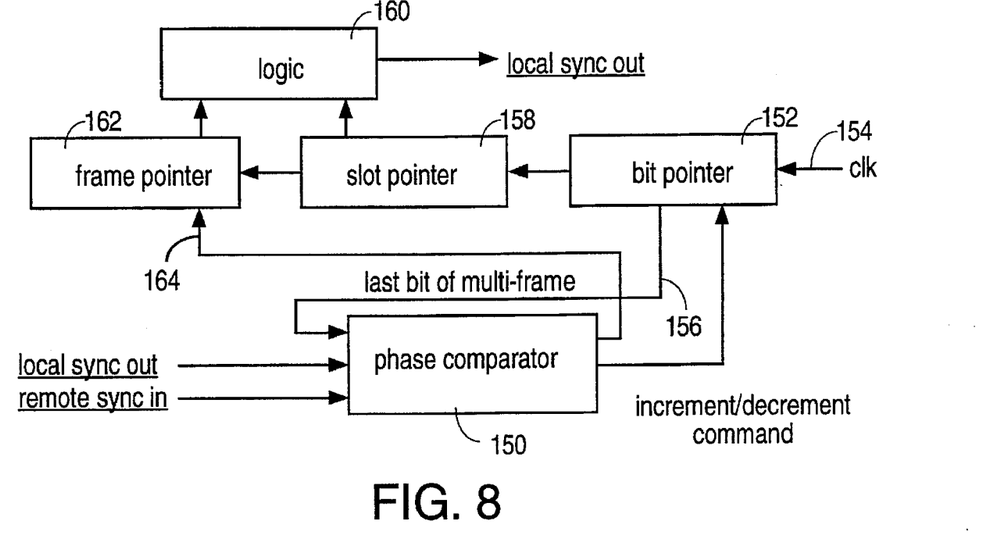
FIG. 8 illustrates another circuit for performing the synchronization technique of FIG. 6 for a multi-frame TDMA format.

FIG. 8 illustrates a digital phase locked loop circuit which can be used in those TDMA systems which group frames into multi-frames (e.g., 16 frames) and treat the multi-frames as a single unit. In such a system, a guard bit in the guard bits field at the beginning or end of the multi-frame unit would be added, deleted, or remain unchanged. A frame pointer 162 counts the frames in the multi-frame unit, and logic circuit 160 outputs a local sync signal at the beginning of a multi-frame unit.

In one type of multi-frame TDMA system, the logic circuit 160 outputs a long frame sync signal, having a duty cycle between 20 to 50%, for signaling the beginning of frame 0, but outputs a short frame sync signal, having a duty cycle less than 20%, for signaling the beginning of the other frames in the multi-frame unit. In such a TDMA system, the preferred embodiment circuit also contains a simple circuit for detecting the duty cycle of the remote sync signal. If it is approximately 50%, then a signal is outputted to the frame pointer 162 via line 164 to reset the frame pointer 162 to frame 0. This obviates the need to count any master frame sync pulses.

The sequencer core 124 in FIG. 4 operates at the bit rate of the TDMA system. The sequencer core 124 uses the bit pointer 152, and if appropriate, frame pointer 162 to identify the beginning of the various fields, slots, and frames in FIG. 5 in order to generate its control flow sequence to assemble the slots for transmission or to deassemble the slots when received.

Although the controller of FIG. 3 is used in both wireless telephone handsets and base stations, the digital phase lock loop shown in FIGS. 7 and 8 is most effectively used by the base stations for frame or multi-frame synchronization. Using the present invention, the base stations can be synchronized by any of the following methods: 1) via a hard-wired synchronization network; 2) via an RF signal from other base stations; and 3) via any Digital Subscriber Line. The telephone handsets will be synchronized at least once per frame using a means other than that described with respect to FIGS. 7 and 8.

The concepts described for obtaining frame synchronization between a master base station and a slave base station can be applied to virtually all communication formats utilizing frames incorporating a guard bits field. Such other formats include a PCM highway, DECT, BRI, PRI, FDDI, Sonet, SDH, or other Digital Subscriber Line.

Note that synchronization is done for spectral efficiency, primarily for integrity of the RF network, but also to maintain pointer integrity in the buffer structure.

By using the digital phase locked loop of FIG. 8, synchronization may be conducted at any time by programming the frame pointer 162 to trigger logic circuit 160 on any frame count. In one embodiment, frame counter 162 is programmable up to modulo 256, and programming is achieved by microprocessor 76 in FIG. 3.

For a DECT system, having 480 bits/slot and 24 slots per frame, the ±1 bit per frame adjustment provided by the DPLL's of FIGS. 7 and 8 provides an 86 ppm adjusting capability, which translates to a lock range of 43 ppm. For the Personal Handy Phone System (PHS), using 240 bits/slot and 8 slots per frame, the adjustment is 520 ppm with a lock range of 260 ppm. In other embodiments which can add or delete greater than ±1 bit per frame or an adjustable number of bits per frame in the guard bits field, the lock range can be much greater. In the preferred embodiment, the leading edge of the sync pulses is detected.

Figure 9:
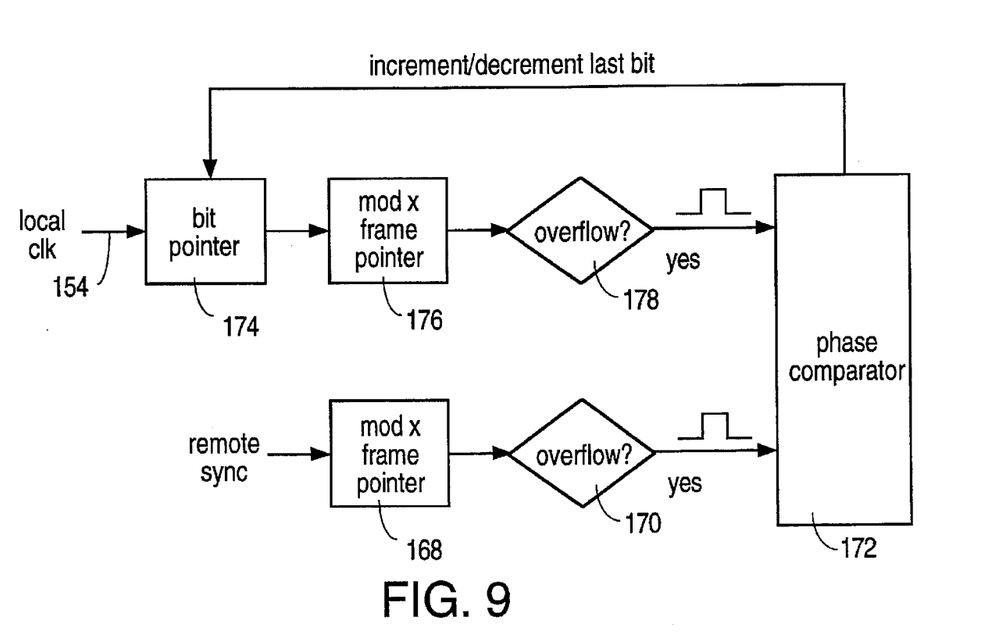
FIG. 9 illustrates another circuit for performing the synchronization technique of FIG. 6.

In another embodiment shown in FIG. 9, which is very similar in concept to that shown in FIGS. 7 and 8, the remote frame sync signal is applied to a programmable modulo X frame pointer 168. The frame pointer 168 may be set to, for example, modulo 0 through modulo 256. An overflow detection circuit 170 determines whether the frame pointer 168 has overflowed. If so, the detection circuit 170 outputs a pulse to a phase comparator 172. The local bit clock in the time base control 122 (FIG. 4) is applied to a bit pointer 174 whose output is connected to a programmable modulo X frame pointer 176, which may be identical to frame pointer 168. An overflow detection circuit 178 is connected between the output of frame pointer 176 and phase comparator 172. Thus, the pulses into phase comparator 172 are equivalent to the local sync and remote sync signals shown in FIGS. 7 and 8, but the programmability of frame pointers 168 and 176 allows resyncing on any frame count. The output of phase comparator 172 increments, decrements, or does not affect the bit pointer 174 when pointing to the last guard bit position, depending upon whether the local sync pulse leads or lags the remote sync pulse.

Other DPLL circuits for adding or deleting a last bit in the guard field of a frame or multi-frame unit would also be suitable and are intended to be covered by this invention.

This discussion has concentrated upon using the DPLL method for both RF and dedicated hard-wired base station synchronization. In the preferred embodiment, whenever a BRI, PRI, FDDI, SONET, SDH, or ATM type of DSL is employed at the base station, the identical phase comparator and frame pointer structure will be used to attain synchronization with the PSTN, and thereby maintain a synchronous boundary across that interface.

The preferred embodiment system also reduces the likelihood of false synchronization when correlating against a sequence of bits which coincidentally match the Unique Word in a received slot. The synchronization function of the Unique Word was discussed with respect to FIG. 2. This feature provides a variable receive synchronization window in which the handheld telephone will accept the Unique Word code as being the actual synchronizing code. By shortening the time window (e.g., to ±1–5 bit periods) before and after the expected position of the Unique Word, the likelihood of false synchronization is reduced. As the window size increases, indicating that a greater time base disparity is being allowed for, the receiver must be enabled by the sequencer to receive the slot at an earlier time to allow for the expected time disparity.

CONCLUSION

This disclosure primarily focuses on those non-conventional features of a TDMA controller. Those circuits typically used in TDMA controllers which have not been described in detail may generally be conventional circuits using conventional algorithms. The concepts described herein may be applied to any TDMA controller, although the examples herein have focused on the Personal Handy Phone System.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A device for synchronization in a TDMA communication system, said system including a plurality of base stations for transmitting and receiving bursts of data within time slots, said slots including a guard field separating said slots, said device comprising:
   a phase comparator having as one input a first synchronizing signal obtained from a remote base station, and having as a second input a second synchronizing signal generated within a local base station,
   an output of said phase comparator controlling circuitry for adding or deleting at least one bit to or from said guard field in at least one of said slots to cause said first synchronizing signal and said second synchronizing signal to be synchronized with respect to one another.

2. The device of claim 1 further comprising:
   a bit pointer connected to a clock within said local base station, an output of said phase comparator being connected to an input of said bit pointer for incrementing or decrementing said bit pointer to delay or advance by at least one bit period said second synchronizing signal applied to said phase comparator.

3. The device of claim 2 wherein said slots are arranged in frames, said device further comprising:
   a slot pointer connected to an output of said bit pointer for counting the number of slots within each frame, an output of said slot pointer being used to generate said second synchronizing signal, said second synchronizing signal indicating the beginning of a frame.

4. The device of claim 3 further comprising:
   a frame pointer connected to an output of said slot pointer, said frame pointer counting a number of frames to determine a start of a multi-frame unit, said device issuing said second synchronizing signal at the start of said multi-frame unit.

5. The device of claim 1 wherein said slots are arranged in frames, and said output of said phase comparator adds or deletes a single bit to or from a guard field in the last slot in said frame.

6. The device of claim 1 wherein said second synchronizing signal is generated within said local base station by detecting a unique word code received by said local base station and deriving said second synchronizing signal based on a time that said unique word was received.

7. The device of claim 1 wherein said slots are grouped in frames, and said first synchronizing signal and said second synchronizing signal are frame synchronization pulses which signify the beginning of a frame.

8. The device of claim 1 further comprising a duty cycle detector for detecting a duty cycle of said first synchronizing signal, and if said detected duty cycle is above a threshold amount, causing a phase comparison operation to be performed by said phase comparator in order to generate said output of said phase comparator to add or delete said at least one bit to or from said guard field.

9. The device of claim 1 wherein said device is located within a sequencer within said TDMA communication system, said device being connected to circuity in said sequencer for controlling the operation of said local base station.

10. A method performed in a TDMA communication system, said system including a plurality of base stations for transmitting and receiving bursts of data within time slots, said slots including a guard field separating said slots, said method comprising the steps of:

detecting a first synchronizing signal obtained from a remote base station;

detecting a second synchronizing signal generated within a local base station;

comparing phases of said first synchronizing signal and said second synchronizing signal; and adding at least one bit to a guard field within a slot if it is determined that said second synchronizing signal is earlier than said first synchronizing signal by at least a first amount, and deleting at least one bit from said guard field in said slot if it is determined that said second synchronizing signal is later than said first synchronizing signal by at least said first amount.

11. The method of claim 10 wherein said first amount is greater than 50% of a bit period within said slot.

12. The method of claim 10 wherein said slots are arranged in frames, and said guard field is within a last slot in a frame.

13. The method of claim 10 wherein said slots are arranged in frames, and only one bit is added to or deleted from a guard field in a last slot in a frame.

14. The method of claim 10 wherein said step of comparing phases is performed by a phase comparator, an output of said phase comparator being connected to a bit position counter connected to a clock within said local base station, said output of said phase comparator incrementing or decrementing said bit position counter to delay or advance by at least one bit period said second synchronizing signal applied to said phase comparator.

15. The device of claim 10 wherein said second synchronizing signal is generated within said local base station by detecting a unique word code received by said local base station and deriving said second synchronizing signal based on a time that said unique word was received.

16. The method of claim 10 wherein said slots are grouped in frames, and said first synchronizing signal and said second synchronizing signal are frame synchronization pulses which signify the beginning of a frame.

17. The method of claim 10 further comprising the steps of:

detecting a duty cycle of said first synchronizing signal, and, if said duty cycle is above a threshold amount, performing said step of comparing phases.

* * * * *